United States Patent [19]
Jamal et al.

[11] Patent Number: 5,930,366
[45] Date of Patent: Jul. 27, 1999

[54] SYNCHRONIZATION TO A BASE STATION AND CODE ACQUISITION WITHIN A SPREAD SPECTRUM COMMUNICATION SYSTEM

[75] Inventors: Karim Jamal, Tokyo; Riaz Esmailzadeh, Kawasaki, both of Japan; Yi-Pin Eric Wang, Cary, N.C.

[73] Assignee: Telefonaktiebolaget L M Ericsson, Stockholm, Sweden

[21] Appl. No.: 08/921,135

[22] Filed: Aug. 29, 1997

[51] Int. Cl.⁶ .................................................. H04L 9/00
[52] U.S. Cl. ................... 380/48; 380/34; 375/200
[58] Field of Search .................... 380/9, 59, 48; 375/200, 206, 207, 367, 209, 354, 343, 365, 316; 370/320, 335, 342, 441, 479, 350, 512, 509, 491

[56] References Cited

U.S. PATENT DOCUMENTS

| 4,943,974 | 7/1990 | Motamedi ............................... 375/200 |
| 5,416,797 | 5/1995 | Gilhousen et al. ...................... 375/705 |
| 5,778,316 | 7/1998 | Persson et al. ......................... 455/434 |

FOREIGN PATENT DOCUMENTS

| 0 744 840 | 5/1996 | European Pat. Off. . |
| WO 93/15573 | 8/1993 | WIPO . |

OTHER PUBLICATIONS

Baier, Alfred, et al., Design Study for a CDMA–Based Third–Generation Mobile Radio System, pp. 733–743.

Higuchi, Kenichi, et al. Fast Cell Search Algorithm using Long Code Masking in DS–CDMA Asynchronous Cellular System, pp. 1–6 (with translation).

Primary Examiner—Tod T Swann
Assistant Examiner—Trevor Coddington
Attorney, Agent, or Firm—Jenkens & Gilchrist

[57] ABSTRACT

Each transmission frame within a spread spectrum communications system relating to synchronization code transmission is divided into a plurality of slots. Each of the slots includes a primary (pilot) code $\bar{c}_p$ and a secondary (combined) code $\bar{c}_{s/Ici}$ that includes information identifying or indicative of both a frame timing and a scrambling code for synchronization. This information concerning frame timing and scrambling code may be encoded in the combined code $\bar{c}_{s/Ici}$ itself, as well as in the modulation values of the sequences of plural combined codes within a frame. Alternatively, the information is encoded in the sequence of plural combined codes $\bar{c}_{s/Ici}$ transmitted in each frame, as well as in the modulated values of the sequences of plural combined codes within a frame. As yet another alternative, the information is encoded in the timing of the combined code $\bar{c}_{s/Ici}$ transmission within each slot of the frame relative to its associated primary code $\bar{c}_p$.

40 Claims, 4 Drawing Sheets

SYNCHRONIZATION TO A BASE STATION AND CODE ACQUISITION WITHIN A SPREAD SPECTRUM COMMUNICATION SYSTEM

CROSS REFERENCE TO RELATED APPLICATION

The present application for patent is related to U.S. application for patent Ser. No. 08/884,002, entitled "MOBILE STATION SYNCHRONIZATION WITHIN A SPREAD SPECTRUM COMMUNICATIONS SYSTEM", filed Jun. 27, 1997.

BACKGROUND OF THE INVENTION

1. Technical Field of the Invention

The present invention relates to spread spectrum communications systems and, in particular, to cell search activities performed by a mobile station to acquire time synchronization with a base station and obtain the cell-specific long code used in a spread spectrum communications system.

2. Description of Related Art

The cellular telephone industry has made phenomenal strides in commercial operations throughout the world. Growth in major metropolitan areas has far exceeded expectations and is outstripping system capacity. If this trend continues, the effects of rapid growth will soon reach even the smallest markets. The predominant problem with respect to continued growth is that the customer base is expanding while the amount of electromagnetic spectrum allocated to cellular service providers for use in carrying radio frequency communications remains limited. Innovative solutions are required to meet these increasing capacity needs in the limited available spectrum as well as to maintain high quality service and avoid rising prices.

Currently, channel access is primarily achieved using Frequency Division Multiple Access (FDMA) and Time Division Multiple Access (TDMA) methods. In frequency division multiple access systems, a physical communication channel comprises a single radio frequency band into which the transmission power of a signal is concentrated. In time division multiple access systems, a physical communications channel comprises a time slot in a periodic train of time intervals over the same radio frequency. Although satisfactory performance is being obtained from FDMA and TDMA communications systems, channel congestion due to increasing customer demand commonly occurs. Accordingly, alternate channel access methods are now being proposed, considered and implemented.

Spread spectrum comprises a communications technique that is finding commercial application as a new channel access method in wireless communications. Spread spectrum systems have been around since the days of World War II. Early applications were predominantly military oriented (relating to smart jamming and radar). However, there is an increasing interest today in using spread spectrum systems in communications applications, including digital cellular radio, land mobile radio, and indoor/outdoor personal communication networks.

Spread spectrum operates quite differently from conventional TDMA and FDMA communications systems. In a direct sequence code division multiple access (DS-CDMA) spread spectrum transmitter, for example, a digital symbol stream for a given dedicated or common channel at a basic symbol rate is spread to a chip rate. This spreading operation involves applying a channel unique spreading code (sometimes referred to as a signature sequence) to the symbol stream that increases its rate (bandwidth) while adding redundancy. Typically, the digital symbol stream is multiplied by the unique digital code during spreading. The intermediate signal comprising the resulting data sequences (chips) is then added to other similarly processed (i.e., spread) intermediate signals relating to other channels. A base station unique scrambling code (often referred to as the "long code" since it is in most cases longer than the spreading code) is then applied to the summed intermediate signals to generate an output signal for multi-channel transmission over a communications medium. The dedicated/common channel related intermediate signals advantageously then share one transmission communications frequency, with the multiple signals appearing to be located on top of each other in both the frequency domain and the time domain. Because the applied spreading codes are channel unique, however, each intermediate signal transmitted over the shared communications frequency is similarly unique, and through the application of proper processing techniques at the receiver may be distinguished from others.

In the DS-CDMA spread spectrum mobile station (receiver), the received signals are recovered by applying (i.e., multiplying, or matching) the appropriate scrambling and spreading codes to despread, or remove the coding from the desired transmitted signal and return to the basic symbol rate. Where the spreading code is applied to other transmitted and received intermediate signals, however, only noise is produced. The despreading operation thus effectively comprises a correlation process comparing the received signal with the appropriate digital code to recover the desired information from the channel.

Before any radio frequency communications or information transfer between a base station and a mobile station of the spread spectrum communications system can occur, the mobile station must find and synchronize itself to the timing reference of that base station. This process is commonly referred to in the art as "cell searching". In a direct sequence code division multiple access spread spectrum communications system, for example, the mobile station must find downlink chip boundaries, symbol boundaries and frame boundaries of this timing reference clock. The most common solution implemented to this synchronization problem has the base station periodically transmit (with a repetition period $T_p$), and the mobile station detect and process, a recognizable pilot code $\bar{c}_p$ of length $N_p$ chips as shown in FIG. 1. The pilot code may also be referred to in the art as a spreading code for long code masked symbols. This pilot code is sent with a known modulation and without any long code scrambling. In one type of CDMA communications system, each base station utilizes a different, known pilot code taken from a set of available pilot codes. In another type of CDMA communications system, all base stations utilize the same pilot code, with differences between base stations being identified through the use of differing phase shift of the pilot code for the transmissions.

In the spread spectrum receiver of the mobile station, the received signals are demodulated and applied to a filter matched to the pilot code(s). It is, of course, understood that alternate detection schemes, such as sliding correlation, may be used for pilot code processing. The output of the matched filter peaks at times corresponding to the reception times of the periodically transmitted pilot code. Due to the effects of multi-path propagation, several peaks may be detected relating to a single pilot code transmission. From processing these received peaks in a known manner, a timing reference with respect to the transmitting base station may be found with an ambiguity equal to the repetition period $T_p$. If the repetition period equals the frame length, then this timing reference may be used to synchronize mobile station and base station communications operation with respect to frame timing.

While any length of $N_p$ in chips for the transmitted pilot code $\bar{c}_p$ may be selected, as a practical matter the length of $N_p$ in chips is limited by the complexity of the matched filter implemented in the mobile station receiver. At the same time, it is desirable to limit the instantaneous peak power $\hat{P}_p$ of the pilot code signal/channel transmissions in order not to cause high instantaneous interference with other spread spectrum transmitted signals/channels. To obtain sufficient average power with respect to pilot code transmissions given a certain chip length $N_p$, it may become necessary in the CDMA communications system to utilize a pilot code repetition period $T_p$ that is shorter than a frame length $T_f$ as illustrated in FIG. 2.

Another reason for transmitting multiple pilot codes $\bar{c}_p$ within a single frame length $T_f$ is to support inter-frequency downlink synchronization in the compressed mode known to those skilled in the art. With compressed mode processing, downlink synchronization on a given carrier frequency is carried out during only part of a frame rather than during (across) the entire frame. It is possible, then, with only one pilot code $\bar{c}_p$ per frame, that compressed mode processing could miss over a significant time period detecting the pilot code completely. By transmitting multiple pilot codes $\bar{c}_p$ during each frame, multiple opportunities per frame are given for compressed mode processing detection, and at least one pilot code transmission will be capable of being detected.

There is, however, a drawback with respect to reception and synchronization experienced with multiple pilot code $\bar{c}_p$ transmission within a single frame length $T_f$. Again, the received signals are demodulated and applied to a filter (or correlator) matched to the known pilot code. The output of the matched filter peaks at times corresponding to the reception times of the periodically transmitted pilot code. From processing these peaks, a timing reference for the transmitting base station relating to the pilot code repetition period $T_p$ may be found in the manner well known in the art. However, this timing reference is ambiguous with respect to the frame timing and thus does not present sufficient information to enable base/mobile station frame synchronization to the timing reference. By ambiguous it is meant that the boundary of the frame (i.e., its synchronization) cannot be identified from the detected pilot code peaks alone.

The process for cell searching may further involve obtaining the cell specific long code used on the downlink to scramble downlink dedicated and common channel communications. The dedicated channels comprise both traffic and control channels, and the common channels also comprise traffic and control channels (which may include the broadcast control channel (BCCH)). A long code group code $\bar{c}_{lci}$ is preferably transmitted synchronously with (and further preferably orthogonal to) the pilot codes $\bar{c}_p$ as illustrated in FIG. 3. This long code group code is sent with a known modulation and without any long code scrambling. Each long code group code $\bar{c}_{lci}$ indicates the particular subset of a total set of long codes to which the cell specific long code utilized for the transmission belongs. For example, there may be one-hundred twenty-eight total long codes grouped into four subsets of thirty-two codes each. By identifying the transmitted long code group code $\bar{c}_{lci}$, the receiver may narrow its long code acquisition search in this example to only the thirty-two long codes contained in the subset identified by the received long code group code $\bar{c}_{lci}$.

Frame timing information may be found from a combined processing of the received pilot codes $\bar{c}_p$ and long code group codes $\bar{c}_{lci}$. A mobile station first identifies pilot code timing by applying a $\bar{c}_p$ matched filter to a received signal and identifying peaks. From these peaks, a timing reference with respect to the slots may be found. Although ambiguous as to frame timing, the determined slot locations identify the timing for the simultaneous transmission of the long code group code $\bar{c}_{lci}$. Correlation is then performed at the known slot locations to obtain the long code group code $\bar{c}_{lci}$ identification. From this identification, the number of possible cell specific long codes used for the transmission is reduced. Lastly, a correlation is performed against each of the reduced number of long codes (i.e., those long codes contained in the $\bar{c}_{lci}$ identified subset) at each of the known slots to determine which cell specific long code is being used for the transmission and provide a phase shift reference. Once the phase shift is found, frame timing is identified.

In connection with the transmission of multiple pilot codes $\bar{c}_p$ within a single frame length $T_f$, the determination of frame timing is alternatively assisted in the manner disclosed in U.S. application for patent Ser. No. 08/884,002, entitled "MOBILE STATION SYNCHRONIZATION WITHIN A SPREAD SPECTRUM COMMUNICATIONS SYSTEM", filed Jun. 27, 1997, by having each of the slots include not only a pilot code $\bar{c}_p$, as in FIG. 2 described above, but also a framing synchronization code $\bar{c}_s$ transmitted with a known modulation and without long code scrambling, as illustrated in FIG. 4. The pilot code is the same in each slot and across the repeating frames. The framing synchronization codes, however, are unique for each slot in a frame, and are repeated in each frame.

To obtain frame timing information, a mobile station first identifies pilot code timing by applying a $\bar{c}_p$-matched filter to a received signal and identifying peaks. From these peaks, a timing reference with respect to the slots may be found. While this timing reference is ambiguous as to frame timing, knowledge of the slot locations indirectly points to the location of the framing synchronization code $\bar{c}_s$ within each located slot. The mobile station then further correlates the set of known framing synchronization codes $\bar{c}_s$ to the received signal at the locations of framing synchronization codes. Given that the position of each framing synchronization code $\bar{c}_s$ relative to the frame boundary is known, once a correlation match is found at the location, the boundary of the frame relative thereto (and hence, the frame timing) is then also known.

Although the foregoing methods for obtaining synchronization information provide satisfactory results, their efficiency leaves much to be desired. For example, the processing of the long code group code $\bar{c}_{lci}$ does not directly provide a frame timing indication, thus requiring additional correlations to be performed at each identified slot location to determine frame synchronization. Conversely, while the processing of the framing synchronization code $\bar{c}_s$ provides a frame timing indication, completion of the cell searching process still further requires the performance of additional correlations to determine the cell specific long code being used for transmission. In each case, the additional correlations being performed occupy valuable processing resources, are complex to implement, and slow the cell searching process. There is a need then for a more efficient method of obtaining both a frame timing indication and a long code indication during the cell searching process.

SUMMARY OF THE INVENTION

Each frame of a base station transmission within a spread spectrum communications system relating to synchronization code transmission is divided into a plurality of slots. Each of the slots includes a primary synchronization code $\bar{c}_p$ and a secondary synchronization code $\bar{c}_{s/lci}$ (hereinafter referred to as the combined code) including both framing synchronization (s) and scrambling or long code indicating (lci) information. In a first embodiment of the invention, the frame timing and scrambling code information is encoded in the combined code $\bar{c}_{s/lci}$ itself, as well as in the modulation values of the sequences of plural combined codes within a frame. In a second embodiment of the present invention, the frame timing and scrambling code information is encoded in the sequence of plural combined codes $\bar{c}_{s/lci}$ transmitted in each frame, as well as in the modulated values of the sequences of plural combined codes within a frame. Additional encoding of the combined code itself (as in the first embodiment) may be used to provide further frame timing and scrambling code information. Lastly, in a third embodiment of the present invention, frame timing and scrambling code information is encoded in the timing of the combined code $\bar{c}_{s/lci}$ transmission within each slot of the frame relative to its associated pilot code $\bar{c}_p$. Additional encoding of the combined code itself and the modulation sequence (as in the first embodiment) may be used to provide further frame timing and scrambling code information.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 5:
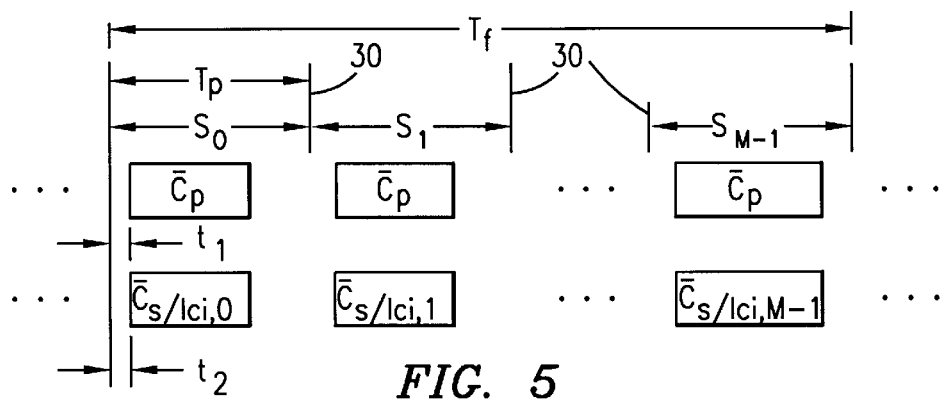
FIG. 5 is a diagram illustrating a present invention combined pilot code and combined code transmission format in a direct sequence code division multiple access communications system.

Reference is now made to FIG. 5 wherein there is shown a diagram illustrating a present invention signal transmission format in a spread spectrum communications system (such as a direct sequence code division multiple access communications system). Each frame having a length $T_f$ of a signal transmission is divided into a plurality of slots $s_0, s_1, \ldots, s_{M-1}$. The length of each slot s is equal to a pilot code repetition period $T_p$. Each of the slots includes a pilot code $\bar{c}_p$ (the primary synchronization code) and a combined framing synchronization (s) and long code indicating (lci) code $\bar{c}_{s/lci}$ (hereinafter referred to as the combined code or secondary synchronization code). The pilot code is the same in each slot and across the repeating frames, and is transmitted with a known modulation and without long code scrambling. The pilot code $\bar{c}_p$ and combined code $\bar{c}_{s/lci}$ are preferably simultaneously transmitted, and overlapping. The combined codes may, for instance, be the same in each slot ($\bar{c}_{s/lci,i}=\bar{c}_{s/lci,j}$; for all i and j), or different in each slot ($\bar{c}_{s/lci,i} \neq \bar{c}_{s/lci,j}$; for all i≠j). The multiple combined codes $\bar{c}_{s/lci,0}, \bar{c}_{s/lci,1}, \ldots, \bar{c}_{s/lci,M-1}$ are transmitted one per corresponding slot $s_0, s_1, \ldots, s_{M-1}$, and are repeated in each frame. The combined code is similarly transmitted without any long code scrambling. Furthermore, the multiple combined codes $\bar{c}_{s/lci,0}, \bar{c}_{s/lci,1}, \ldots, \bar{c}_{s/lci,M-1}$ are preferably orthogonal to the pilot code. The pilot code $\bar{c}_p$ has a predetermined timing offset t, with respect to a boundary 30 of its corresponding slot. Each combined code $\bar{c}_{s/lci}$ has a timing offset $t_2$ with respect to the slot boundary 30. The timing offset $t_1$ is preferably set equal to the timing offset $t_2$ (i.e., simultaneous pilot code $\bar{c}_p$ and combined code $\bar{c}_{s/lci}$ transmission) in order to take advantage of processing simplifications relating to phase detection, as will be described.

Figure 1:
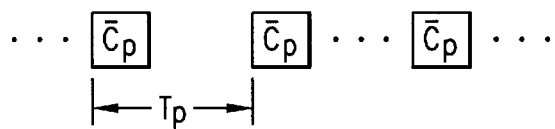
FIG. 1, previously described, is a diagram illustrating a prior art pilot channel signal transmission format in a direct sequence code division multiple access (DS-CDMA) communications system.
Figure 2:
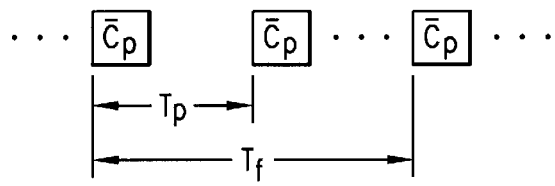
FIG. 2, previously described, is a diagram illustrating an alternate prior art pilot channel signal transmission format in a direct sequence code division multiple access communications system.
Figure 3:
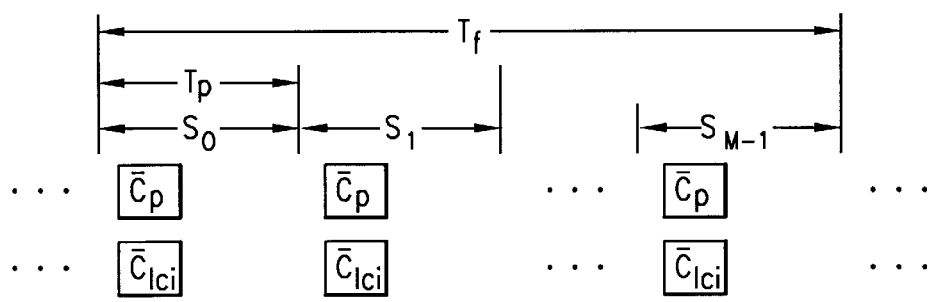
FIG. 3, previously described, is a diagram illustrating an alternate prior art pilot channel and long code group channel signal transmission format in a direct sequence code division multiple access communications system.
Figure 4:
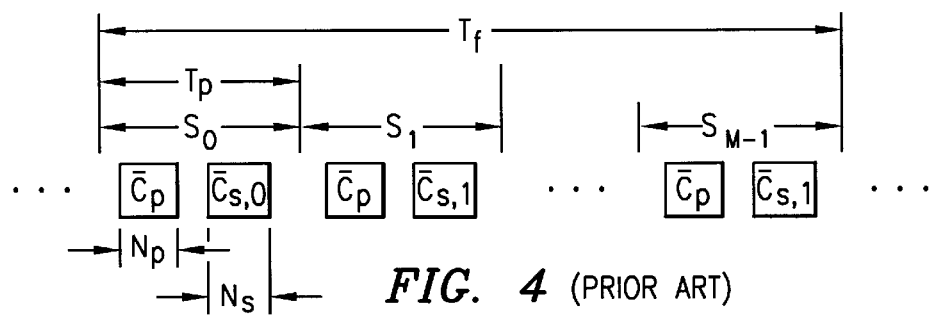
FIG. 4, previously described, is a diagram illustrating yet another alternate prior art pilot code and framing synchronization code transmission format in a direct sequence code division multiple access communications system.

The combined code $\bar{c}_{s/lci}$ includes information identifying or indicative of both the frame timing and the long code. This advantageously eliminates the need to make a separate long code group code transmission on the downlink (see, FIG. 3). Furthermore, more efficient processing of the combined code is made to detect both framing timing and the long code used in scrambling the downlink transmission.

There are a number of possible techniques for including both frame timing and long code information in the combined code $\bar{c}_{s/lci}$. One technique comprising a first embodiment of the invention (including several different implementations as discussed below), in general, encodes the frame timing and long code information in the combined code $\bar{c}_{s/lci}$ itself, as well as in the modulation values of the sequences of combined codes. Another technique comprising a second embodiment of the present invention (including a specific implementation as discussed below), in general, encodes the frame timing and long code information in the sequence of plural combined codes $\bar{c}_{s/lci}$ transmitted in each frame, as well as in the modulated values of the sequences of plural combined codes. Additional encoding of the combined code itself (as in the first embodiment technique) may be used to provide further frame timing and/or long code information. Another technique comprising a third embodiment of the present invention (including several different implementations as discussed below), in general, encodes frame timing and/or long code information in the timing of the combined code $\bar{c}_{s/lci}$ transmission relative to the pilot code $\bar{c}_p$. Additional encoding of the combined code itself and the modulation sequence (as in the first embodiment technique) may be used to provide further frame timing and/or long code information.

Turning now specifically to the first embodiment of the present invention, there are $N_{s/lci}$ in number possible valid combined codes $\bar{c}_{s/lci}$. These $N_{s/lci}$ possible combined codes may provide $\log_2 (N_{s/lci})$ bits of information for use in conveying the long code information comprising either the long code group code (which identifies the subset of possible long codes used in scrambling the downlink transmission), or the actual long code itself. By this it is meant that by the receiver finding the particular one of the $N_{s/lci}$ combined codes that was actually transmitted, $\log_2(N_{s/lci})$ bits of information have been obtained indicating the long code. For example, with two-hundred fifty-six long codes grouped into four groups of sixty-four codes each, $N_{s/lci}$=4 and thus there are four possible combined codes $\bar{c}_{s/lci}$. When the receiver determines that the combined code $\bar{c}_{s/lci}$ that was transmitted is, for example, number three, then it also knows that the particular long code at issue was selected from group number three. By this process, in this example, $\log_2(4)=2$ bits worth of information is received. The combined codes $\bar{c}_{s/lci}$ in a given frame are further modulated by one of $N_{mod}$ in number possible valid (e.g., binary or quadrature) modulation sequences. Each valid modulation sequence inherently provides the frame timing information. The $N_{mod}$ valid modulation sequences further provide $\log_2(N_{mod})$ bits of information for use in conveying (more) long code information (if $N_{mod}>1$). In this embodiment, it is preferred that the modulation sequences have good auto-correlation properties. Furthermore, if $N_{mod}>1$, good cross-correlation properties are also desired, and also no cyclic shift of any valid modulating sequence may result in another valid modulating sequence (or any cyclic shift thereof).

In accordance with one method of present invention for recovering the transmitted information, by applying a $\bar{c}_p$-matched filter, the mobile station (receiver) locates each of the slots, and hence the location of the combined codes $\bar{c}_{s/lci}$. This correlation further provides a channel phase reference useful in coherently detecting the modulation values of the combined codes $\bar{c}_{s/lci}$ within the slots. The receiver may then (for example, in parallel) correlate the received combined codes with each of the $N_{s/lci}$ possible combined codes. This may be done over one frame, thus collecting $N_{s/lci}$ sequences of M correlation values. These $N_{s/lci}$ sequences of M correlation values (comprising the $N_{s/lci}$ rows and M columns of a first matrix—Z1) are then correlated (or matched) with a M possible shifts of all the $N_{mod}$ possible modulating sequences (comprising the $M*N_{mod}$ columns and M rows of a second matrix—M1). This correlation may be mathematically represented by the multiplication of the first matrix (Z1) by the second matrix (M1). In this process, a compensation for the channel phase must be taken into account. An estimate of the channel phase is obtained from the pilot code correlations (as mentioned above). The correlation (M1Z1) that gives the best match (i.e., highest magnitude) indicates the combined code that was used (thus providing the long code information) and further indicates the modulation sequence (thus providing more long code information (if $N_{mod}>1$)) and its shift that was used (thus providing the frame timing information).

Figure 6A:
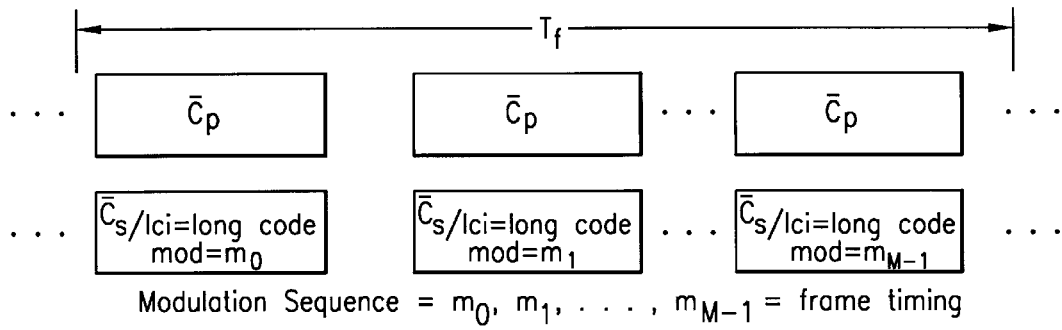
FIGS. 6A–6F illustrate a plurality of embodiments of the present invention for including both frame timing and long code information in a combined code.

In a first implementation (relating to the first embodiment of the present invention) shown in FIG. 6A, the information bits of each combined code $\bar{c}_{s/lci}$ in a frame are the same in each slot, and convey the long code information comprising either the long code group code (which identifies the subset of possible long codes used in scrambling the downlink transmission), or the actual long code itself. A predetermined modulation sequence is then applied to the multiple included combined codes $\bar{c}_{s/lci,0}$, $\bar{c}_{s/lci,1}$, ..., $\bar{c}_{s/lci,M-1}$ within a frame to define the frame timing information.

The modulation selected for defining the frame timing information may be either coherent or differential. With coherent modulation, a phase reference is derived by the mobile station (receiver) from the associated pilot code $\bar{c}_p$ since it is typically modulated by a known symbol value (for example, "+1"). In this case, the distance between the pilot code $\bar{c}_p$ and its associated combined code $\bar{c}_{s/lci}$ from the same slot must be kept as small as possible (preferably zero providing for simultaneous transmission) in order for the mobile station to make accurate phase determinations. This is because a very large frequency error in the receiver may result in a large phase shift in a very short time interval. With differential modulation, on the other hand, the frame timing information is contained in the phase changes between successive combined codes $\bar{c}_{s/lci}$ in consecutive slots. In this case, a reasonably fine frequency synchronization must be acquired before the time synchronization process is implemented to detect the modulation sequence by the mobile station.

A more complete understanding of this first implementation may be obtained by reference to some examples. In a first example providing a binary phase shift keyed (BPSK) modulation, the combined code $\bar{c}_{s/lci}$ itself provides the long code information. This information may comprise either the long code itself, or a long code group code pointing to the subset of long codes from which the cell specific long code was selected. The sequence of binary modulation values (e.g., +1, −1, −1, +1, ..., +1, −1, −1) for the combined codes $\bar{c}_{s/lci}$ in a given frame provides the frame timing information.

Thus, in the foregoing example, the first combined code $\bar{c}_{s/lci,0}$ for the first slot in the frame is modulated by +1, the second combined code $\bar{c}_{s/lci,1}$ for the second slot in the frame is modulated by −1, and so on.

In a second example providing a quadrature phase shift keyed (QPSK) modulation, the combined code $\bar{c}_{s/lci}$ itself again provides the long code information. This information may comprise either the long code itself, or a long code group code pointing to the subset of long codes from which the cell specific long code was selected. The first quarter of the M−1 combined codes $\bar{c}_{s/lci}$ in a given frame are modulated by a phase value of "0" (i.e., multiplied by "+1"), the next quarter of the codes are modulated by a phase value of "$\pi/2$" (i.e., multiplied by "+j"), the third quarter of the codes are modulated by a phase value of "$\pi$" (i.e., multiplied by "−1"), and the final quarter of the codes are modulated by a phase value of "$3\pi/2$" (i.e., multiplied by "−j").

Figure 6B:
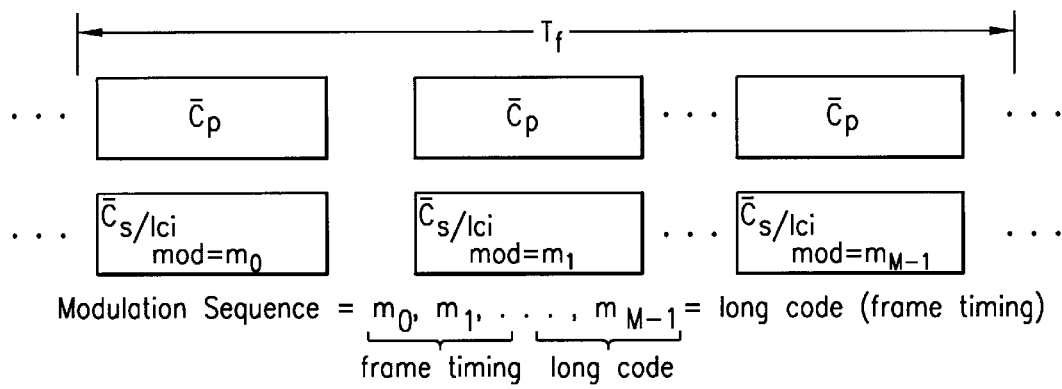

In a second implementation (relating to the first embodiment of the present invention) shown in FIG. 6B, the combined codes $\bar{c}_{s/lci}$ in a frame are the same in each slot. A predetermined modulation sequence is then applied to the multiple included combined codes $\bar{c}_{s/lci,0}$, $\bar{c}_{s/lci,1}$, ..., $\bar{c}_{s/lci,M-1}$ within a frame, with the modulation sequence values (e.g., +1, −1, −1, +1, ..., +1, −1, 1) defining both the long code information (comprising either the long code group code which identifies the subset of possible long codes used in scrambling the downlink transmission, or the actual long code itself) and the frame timing information (uniquely identifying the associated slot). Again, the modulation selected for defining the frame timing information and long code information may be either coherent or differential.

A more complete understanding of this second implementation may be obtained by reference to some examples. In a first example, a first portion of the modulation sequence for the combined codes $\bar{c}_{s/lci}$ explicitly defines the long code information, and a second portion of the modulation sequence explicitly defines the frame timing information. Care must be taken in selecting the patterns for the first and second portions of the modulation sequence to ensure unambiguous detection ability. Thus, certain valid patterns for frame timing information comprising the second portion of the modulation sequence must be excluded from the valid patterns for the long code information comprising the first portion of the modulation sequence (and/or, vice versa, if appropriate).

In a second example, the modulation sequence for the combined codes $\bar{c}_{s/lci}$ 10 explicitly defines the long code information and implicitly defines the frame timing. For this implementation, there are only a limited (for example, M−1 in a binary phase shift keyed modulation) number of different valid modulation sequences for a frame. The values of these modulation sequences define the long code information comprising either the long code group code which identifies the subset of possible long codes used in scrambling the downlink transmission, or the actual long code itself. Furthermore, as there are only a limited number of modulation sequences, the finding of any one of those limited in number modulation sequences in a frame implicitly supplies frame timing information (as the first element of each modulation sequence is know and can be associated with an associated first slot).

Figure 6C:
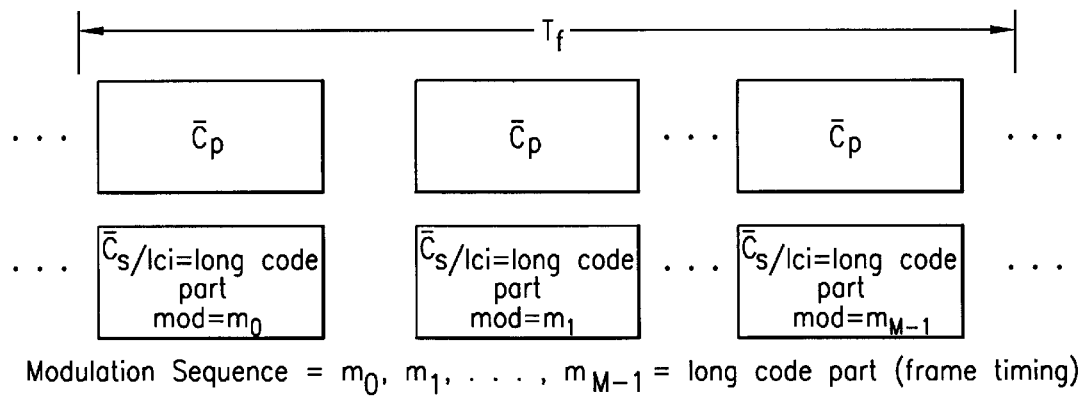

In a third implementation (relating to the first embodiment of the present invention) shown in FIG. 6C, the combined code $\bar{c}_{s/lci}$ in a frame is the same in each slot, and define (to a limited degree) the long code information. A predetermined modulation sequence is then applied to the multiple included combined codes $\bar{c}_{s/lci,0}, \bar{c}_{s/lci,1}, \ldots, \bar{c}_{s/lci,M-1}$ within a frame, with the modulation sequence values (e.g., +1, −1, −1, +1, …, +1, −1, 1) completing the explicit definition of the long code information (comprising either the long code group code which identifies the subset of possible long codes used in scrambling the downlink transmission, or the actual long code itself) and implicitly defining the frame timing information (uniquely identifying the associated slot). Thus, the long code information is distributed over both the combined code $\bar{c}_{s/lci}$ itself and the modulation sequence of the plural combined codes $\bar{c}_{s/lci}$ within a frame. Again, the modulation selected for defining the frame timing information and long code information may be either coherent or differential.

Turning now specifically to the second embodiment of the present invention, there are $N_{s/lci-seq}$ in number possible valid "sequences" of combined codes $\bar{c}_{s/lci}$ for a frame. The selected sequence is repeated in each frame. These $N_{s/lci-seq}$ sequences of combined codes may provide $\log_2(N_{s/lci-seq})$ bits of information for use in conveying the long code information comprising either the long code group code (which identifies the subset of possible long codes used in scrambling the downlink transmission), or the actual long code itself. In this embodiment, it is preferred that the valid sequences of combined codes are unique, and that each one have good auto-correlation and cross-correlation properties. In general practice, it is believed that a single sequence of combined codes is all that is needed. Once a valid sequence of combined codes is found, the frame timing information is inherently provided. As an extension, in cases where the sequence(s) of combined codes do not provide sufficient amounts of long code information (for example, if $N_{s/lci-seq}=1$), the combined codes $\bar{c}_{s/lci}$ in a given frame may further be modulated by one of $N_{mod}$ in number possible valid (e.g., binary or quadrature) modulation sequences. The $N_{mod}$ valid modulation sequences further provide $\log_2(N_{mod})$ bits of information for use in conveying more long code information (likely needed for specifically identifying the cell specific long code itself). In this embodiment, it is preferred that the modulation sequences have good auto-correlation properties, good cross-correlation properties, and also no cyclic shift of any valid modulating sequence may result in another valid modulating sequence (or any cyclic shift thereof).

In accordance with one method of present invention for recovering the transmitted information, by applying a $\bar{c}_p$-matched filter, the mobile station (receiver) locates each of the slots, and hence the location of the combined codes $\bar{c}_{s/lci}$. This correlation further provides a channel phase reference useful in coherently detecting the combined codes $\bar{c}_{s/lci}$ within the slots. The receiver may then (for example, in parallel) correlate the received combined codes with each of the M possible shifts of the $N_{s/lci-seq}$ possible combined code sequences. This may be done over one frame, thus collecting $N_{s/lci-seq}*M$ sequences of M correlation values. These $N_{s/lci-seq}*M$ sequences of M correlation values (comprising the $N_{s/lci}*M$ rows and M columns of a first matrix—Z2) are then correlated (or matched) with all the $N_{mod}$ possible modulating sequences (comprising the $N_{mod}$ columns and M rows of a second matrix—M2). This correlation may be mathematically represented by the multiplication of the first matrix (Z2) by the second matrix (M2). In this process, a compensation for the channel phase must be taken into account. An estimate of the channel phase is obtained from the pilot code correlations (as mentioned above). The correlation (Z2M2) that gives the best match (i.e., highest magnitude) indicates the combined code sequence (if $N_{s/lci-seq}>1$) that was used (thus providing the long code information), which shift was used (thus providing the frame timing information), and further indicates the modulation sequence that was used (thus providing the long code information).

Figure 6D:
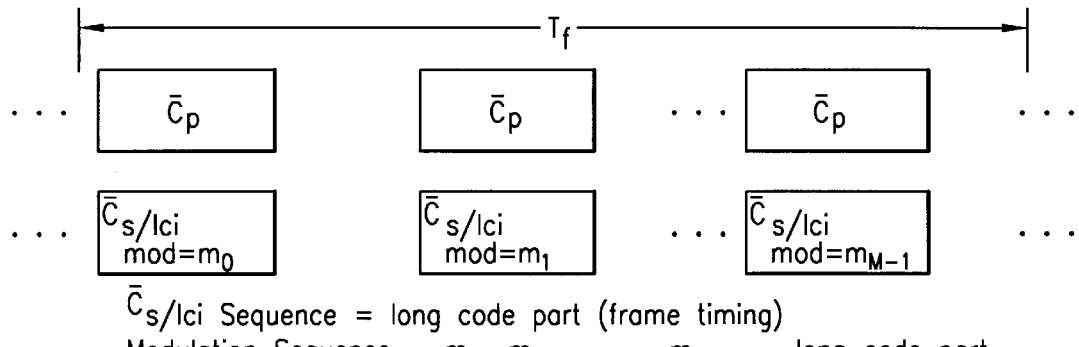

Considering now a specific example of this implementation shown in FIG. 6D, the sequence of the plural combined codes $\bar{c}_{s/lci}$ in a frame define (to some selected degree) the long code information, and implicitly defining the frame timing information (uniquely identifying the associated slot). A predetermined modulation sequence may also be applied to the sequence of combined codes $\bar{c}_{s/lci,0}, \bar{c}_{s/lci,1}, \ldots, \bar{c}_{s/lci,M-1}$ within a frame, with the modulation sequence values (e.g., +1, −1, −1, +1, …, +1, −1, −1) completing the explicit definition of the long code information (comprising either the long code group code which identifies the subset of possible long codes used in scrambling the downlink transmission, or the actual long code itself). Thus, the long code information may be distributed over both the sequence of the combined codes $\bar{c}_{s/lci}$ in a frame and the modulation sequence the combined codes $\bar{c}_{s/lci}$ within a frame. Again, the modulation selected for defining the frame timing information and long code information may be either coherent or differential.

Turning now specifically to the third embodiment of the present invention, there are $N_{s/lci}$ in number possible valid combined codes $\bar{c}_{s/lci}$. These $N_{s/lci}$ combined codes may provide $\log_2(N_{s/lci})$ bits of information for use in conveying any desired information. The combined codes $\bar{c}_{s/lci}$ in a given frame are further placed at one of a number of possible time shifts in relation to the corresponding pilot code. In general, then, the sequences of the combined codes form one of $N_{t2-mod}$ in number possible valid distance sequences specifying the timing offsets $t_2$ between the each combined code $\bar{c}_{s/lci}$ and its associated pilot code $\bar{c}_p$ for the slots in each frame. The $N_{t2-mod}$ valid modulation sequences provide $\log_2(N_{t2-mod})$ bits of information for use in conveying frame timing information and/or long code information.

In accordance with one method of present invention for recovering the transmitted information, by applying a $\bar{c}_p$-matched filter, the mobile station (receiver) locates each of the slots, and hence the approximate location of the combined codes $\bar{c}_{s/lci}$. This correlation further provides a timing reference useful in measuring the timing offsets for the combined codes $\bar{c}_{s/lci}$ within the slots. Once a valid distance sequence relating to the measured timing offsets of the combined codes $\bar{c}_{s/lci}$ is detected, that distance sequence then provides the bits used to give the frame timing information and long code information.

Figure 6E:
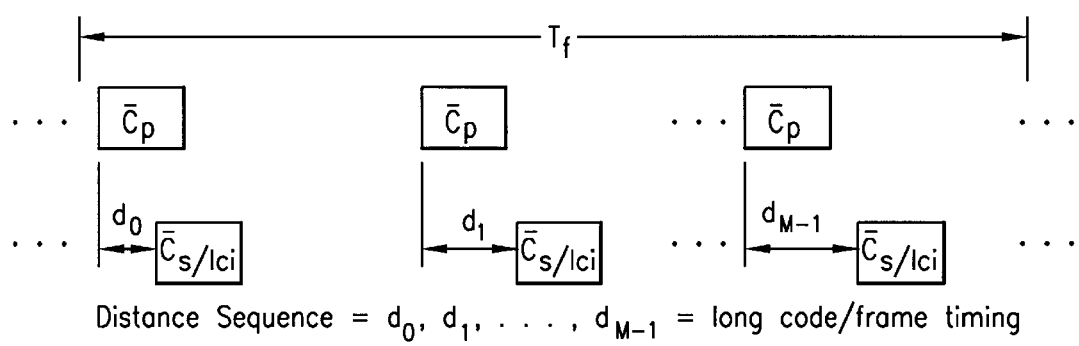

In a first implementation (relating to the third embodiment of the present invention) shown in FIG. 6E, the information bits of each combined code $\bar{c}_{s/lci}$ in a frame are the same in each slot, and comprise any selected predetermined and known information. A predetermined distance sequence is then applied to the multiple included combined codes $\bar{c}_{s/lci,0}$, $\bar{c}_{s/lci,1}$, ..., $\bar{c}_{s/lci,M-1}$ within a frame, with the distance sequence values (e.g., $d_0, d_1, d_2, \ldots, d_{M-1}$) specifying the individual timing offsets $t_2$ between the each combined code $\bar{c}_{s/lci}$ and its associated pilot code $\bar{c}_p$, and further defining both the long code information (comprising either the long code group code which identifies the subset of possible long codes used in scrambling the downlink transmission, or the actual long code itself) and the frame timing information (uniquely identifying the associated slot).

A more complete understanding of this first implementation may be obtained by reference to an example. A first portion of the distance sequence for the combined codes $\bar{c}_{s/lci}$ explicitly defines the long code information, and a second portion of the distance sequence explicitly defines the frame timing information. Care must be taken in selecting the patterns for the first and second portions of the distance sequence to ensure unambiguous detection ability. Thus, certain valid patterns for frame timing information comprising the second portion of the distance sequence must be excluded from the valid patterns for the long code information comprising the first portion of the distance sequence (and/or, vice versa, if appropriate).

Figure 6F:
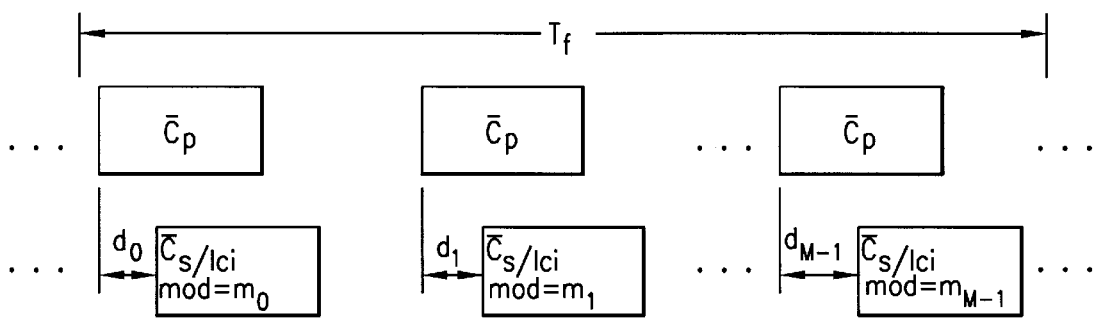

In a second implementation (relating to the third embodiment of the present invention) shown in FIG. 6F, the information bits of each combined code $\bar{c}_{s/lci}$ in a frame are the same in each slot, and comprise any selected predetermined and known information. A predetermined distance sequence is then applied to the multiple included combined codes $\bar{c}_{s/lci,0}, \bar{c}_{s/lci,1}, \ldots, \bar{c}_{s/lci,M-1}$ within a frame, with the distance sequence values (e.g., $d_0, d_1, d_2, \ldots, d_{M-1}$) specifying the individual timing offsets $t_2$ between the each combined code $\bar{c}_{s/lci}$ and its associated pilot code $\bar{c}_p$, and further defining either the long code information (comprising either the long code group code which identifies the subset of possible long codes used in scrambling the downlink transmission, or the actual long code itself) or the frame timing information (uniquely identifying the associated slot). A predetermined modulation sequence is then applied to the multiple included combined codes $\bar{c}_{s/lci,0}$, $\bar{c}_{s/lci,1}, \ldots, \bar{c}_{s/lci,M-1}$ within a frame, with the modulation sequence values (e.g., +1, −1, −1, +1, ..., +1, −1, −1) defining (opposite from that defined with the distance sequence) either the frame timing information or the long code information.

A more complete understanding of this second implementation may be obtained by reference to some examples. In a first example, the modulation sequence for the combined codes $\bar{c}_{s/lci}$ indicates the frame timing information and the distance sequence for the timing offsets $t_2$ indicates the long code information. Conversely, in a second example, the modulation sequence for the combined codes $\bar{c}_{s/lci}$ indicates the long code information and the distance sequence for the timing offsets $t_2$ indicates information the frame timing information.

Figure 7:
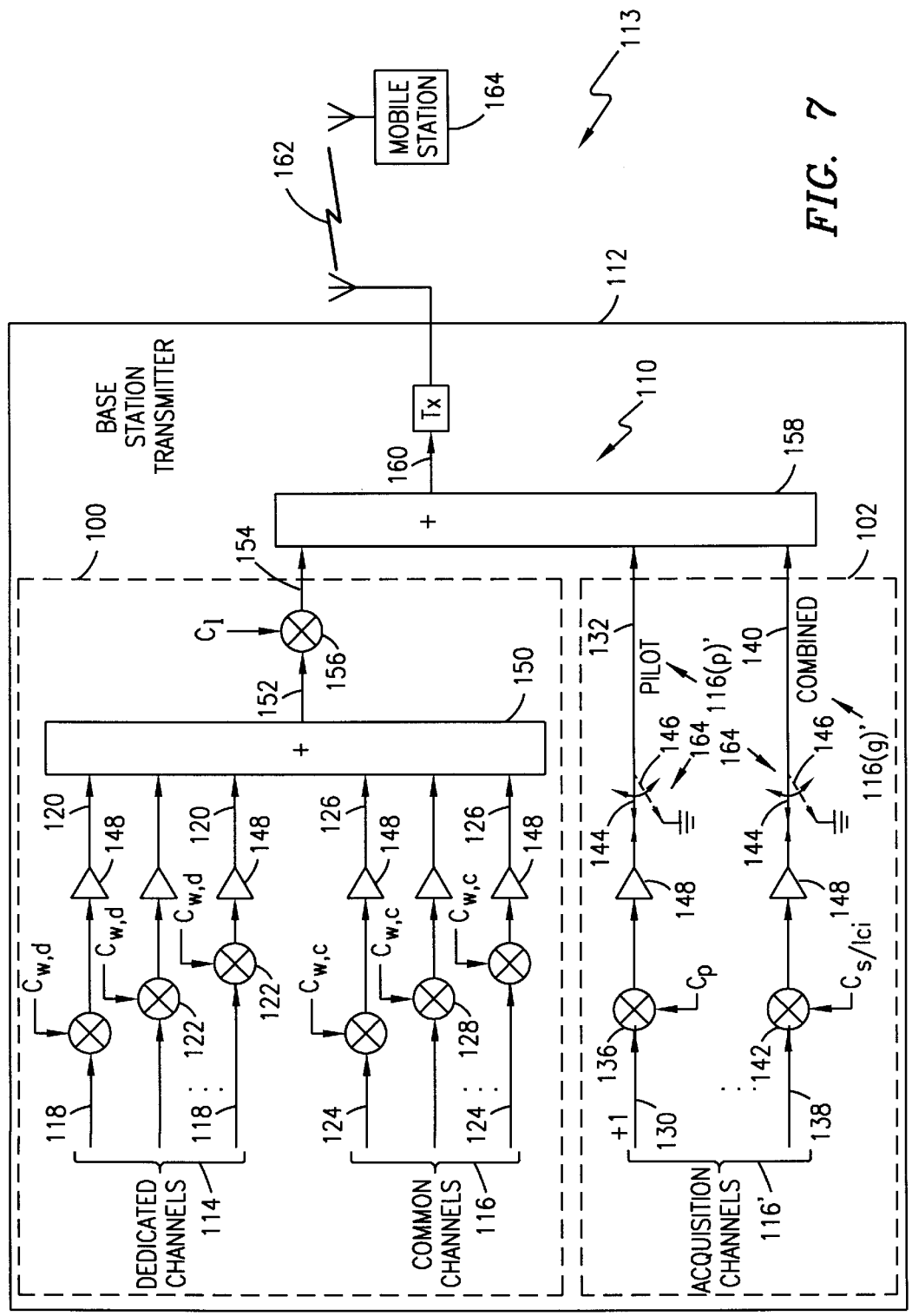
FIG. 7 is a block diagram of a direct sequence code division multiple access (DS-CDMA) spread spectrum communications system.

Reference is now made to FIG. 7 wherein there is shown a block diagram of a direct sequence code division multiple access (DS-CDMA) spread spectrum communications system 113. A base station 112 for the communications system 113 includes a downlink transmitter 110. The transmitter 110 transmits a number of channels on the downlink, and includes a block of channel equipment 100 for information carrying channels including both dedicated channels 114 (including both traffic and control channels) and common channels 116 (also including both traffic and control channels). For each of the dedicated channels 114, a digital symbol stream at a basic symbol rate is received on line 118. This received digital symbol stream is then spread to a transmit chip rate for output as dedicated channel intermediate signal on line 120. This spreading operation involves applying an individual channel unique spreading code $C_{w,d}$ (often referred to as the "signature" sequence) to the received digital symbol stream that increases its rate. A Walsh type code (w) may, for example, be used for the unique spreading code of the dedicated (d) channel. The application of the channel unique spreading code is typically made through the use of a spreader 122 implementing, for example, a multiplication or modulo-two addition.

A similar process is implemented for each of the common channels 116 (including the common broadcast control channel (BCCH)). A digital symbol stream at a basic symbol rate for the common channel is received on line 124. This received digital symbol stream is then spread to a transmit chip rate for output as common channel intermediate signal on line 126. This spreading operation involves applying an individual channel unique spreading code $C_{w,c}$ to the received digital symbol stream that increases its rate. A Walsh type code (w) may, for example, again be used for the unique spreading code of the common (c) channel. The application of the channel unique spreading code is typically made through the use of a spreader 128.

Each of the channels 114 or 116 may include a power adjustment device 148 that processes the generated plural dedicated and common channel intermediate signals received on lines 120 and 126 to effectuate individual control over the transmit power of each channel. The power controlled intermediate signals are then added together by adder 150 to generate a combined signal on line 152. This combined signal is then scrambled by a base station unique scrambling code $C_1$ (referred to as the "long code") to generate an output signal on line 154 for multi-channel transmission over a communications medium. Any suitable scrambling code may be used for the long code. The application of the long code is typically made through the use of a scrambler 156 implementing, for example, a multiplication or modulo-two addition.

The transmitter 110 further includes a block of channel equipment 102 for transmission of acquisition-related (i.e., cell search) channels 116' such as those for use in base station acquisition by a mobile station (like the pilot codes $C_p$ and long code groups codes $C_g$) which do not use either the short Walsh type codes $C_w$ for spreading or the long codes $C_1$ for scrambling used by the dedicated channels 114 or common channels 116. These codes are used for receiver acquisition operations, and are collectively commonly referred to in the prior art as the "long code masked symbols" since they are transmitted with the long code $C_1$ removed. For example, with a pilot channel 116(p)' one of these channels 116' (comprising a primary synchronization channel), a known symbol (such as "+1") is received on line 130. This received known symbol is then spread to a transmit chip rate for output as pilot channel intermediate signal on line 132. This spreading operation involves applying a pilot code $\bar{c}_p$ to the received digital symbol stream that increases its rate. An orthogonal gold code may, for example, be used for the pilot channel. The application of the pilot code is typically made through the use of a spreader 136.

Further, for example, a similar process is implemented for a combined code channel 116(g)' one of these channels 116'

(comprising a secondary synchronization channel). A symbol is received on line 138. This possibly known symbol is then spread to a transmit chip rate for output as a combined code intermediate signal on line 140. This spreading operation involves applying a combined code $\bar{c}_{s/lci}$ to the known symbol, that increases its symbol rate. An orthogonal gold code may, for example, be used for the combined code. The application of the combined code is typically made through the use of a spreader 142.

Each of the channels 116' may include a power adjustment device 148 that processes the generated plural intermediate signals received on lines 132 and 140 to effectuate individual control over the transmit power of each channel. The power controlled intermediate signals for the channels 116' are then selectively added together with the scrambled combined output signal received on line 154 by adder 158 to generate a transmitter output downlink signal on line 160 for transmission. The power control process may, if necessary, be implemented in conjunction with the power control exercised over the dedicated channels 114 and common channels 116 to maintain a substantially constant power output from the transmitter 110 as various ones of channel 116' intermediate signals are added to and deleted from the overall transmitter output signal on line 160. The dedicated/common channels 114 and 116 and acquisition-related channel 116' of the output signal advantageously then share one transmission communications frequency on the communications medium (air interface) 162 to a mobile station 164, with the multiple signals appearing to be located on top of each other in both the frequency domain and the time domain.

Selective addition of each channel 116' intermediate signal (such as the pilot code intermediate signal or the combined code intermediate signal) used for receiver acquisition operations to the scrambled output signal for the dedicated/common channels is controlled by a plurality of hardware and/or software switches 164. One switch 164 is provided for each individual intermediate signal, with the plurality of switches being independently or commonly selected. In accordance with this selection operation performed by switches 164, when an individual one of the switches is in a first physical/logical position (as illustrated by solid line arrow 144), the corresponding intermediate signal is passed on to the power adjustment device 148 and adder 158. Conversely, when the switch is in a second physical/logical position (as illustrated by broken line arrow 146), no corresponding intermediate signal is passed. The channel 116' intermediate signals (such as for the pilot codes and combined codes) are transmitted on a periodic basis. At each instance of transmission, the appropriate switch 164 selects the first position (indicated by arrow 144), and the corresponding intermediate signal of the channels 116' is added to, and transmitted with, the dedicated channels 114 and common channels 116.

The mobile station 164 receives the downlink signals transmitted over the communications medium 162, and processes the signals in the unique manner described above to recover frame timing information and the long code information. This information is then used to synchronize the mobile station 164 to the base station 112 of the communications system 113. Once synchronized, the mobile station 164 may then receive and recover the information being transmitted over the dedicated and common channels. In general, the processes implemented by the mobile station 164 are referred to as despreading since the correlation operations performed effectuate a removal of the spreading sequence from the received transmissions. The outputs resulting from these correlations are provided to detectors which reproduce the original informational data stream. The form of detector used depends on the characteristics of the radio channel and complexity limitations. It may include channel estimation and coherent RAKE combining, or differential detection and combining, as necessary.

Although embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A format for a code division multiple access downlink synchronization code transmission, comprising:

a repeating frame comprising a plurality of slots;

a primary synchronization code $\bar{c}_p$ repeated in each slot of the repeating frame; and a secondary synchronization combined code $\bar{c}_{s/lci}$ providing information useful in a process for identifying both a frame timing and a scrambling code for the downlink transmission.

2. The format of claim 1 wherein the information relating to the scrambling code is conveyed by the combined code $\bar{c}_{s/lci}$ itself.

3. The format of claim 1 wherein the information relating to the frame timing is conveyed by modulation values, selected in accordance with a predetermined modulation sequence, for the plural combined codes $\bar{c}_{s/lci}$ within the frame.

4. The format of claim 3 wherein modulation implemented by the modulation sequence on the plural combined codes $\bar{c}_{s/lci}$ within the frame comprises binary phase shift keyed (BPSK) modulation.

5. The format of claim 3 wherein modulation implemented by the modulation sequence on the plural combined codes $\bar{c}_{s/lci}$ within the frame comprises quadrature phase shift keyed (QPSK) modulation.

6. The format of claim 1 wherein the information relating to the frame timing and scrambling code is conveyed by modulation values, selected in accordance with a predetermined modulation sequence, for the plural combined codes $\bar{c}_{s/lci}$ within the frame.

7. The format of claim 6 wherein the modulation sequence comprises a first portion and a second portion, and wherein a pattern of the modulation defined by the first portion of the modulation sequence provides the information relating to the frame timing, and a pattern of the modulation defined by the second portion of the modulation sequence provides the information relating to the scrambling code.

8. The format of claim 6 wherein a pattern of the modulation defined by the modulation sequence explicitly provides the information relating to the scrambling code and implicitly provides the information relating to the frame timing.

9. The format of claim 1 wherein a part of the information relating to the scrambling code is conveyed by the combined code $\bar{c}_{s/lci}$ itself.

10. The format of claim 9 wherein the information relating to the frame timing and scrambling code is conveyed by modulation values, selected in accordance with a predetermined modulation sequence, for the plural combined codes $\bar{c}_{s/lci}$ within the frame.

11. The format of claim 10 wherein a pattern of the modulation defined by the modulation sequence explicitly provides another part of the information relating to the scrambling code and implicitly provides the information relating to the frame timing.

12. The format of claim 1 wherein at least part of the information relating to the scrambling code is conveyed by a sequence of the combined codes $\bar{c}_{s/lci}$ included within the frame, the sequence further implicitly providing the information relating to the frame timing.

13. The format of claim 12 wherein further information relating to the scrambling code is conveyed by modulation values, selected in accordance with a predetermined modulation sequence, for the plural combined codes $\bar{c}_{s/lci}$ within the frame.

14. The format of claim 13 wherein a pattern of the modulation defined by the modulation sequence explicitly provides another part of the information relating to the scrambling code.

15. The format of claim 1 wherein each combined code $\bar{c}_{s/lci}$ is offset from its associated primary code $\bar{c}_p$ in a slot by a distance specified by a pattern of distances in a distance sequence, and wherein the pattern of distances defined by the distance sequence provides the information useful in identifying frame timing and/or scrambling code.

16. The format of claim 15 wherein the distance sequence comprises a first portion and a second portion, and wherein a pattern of the distances defined by the first portion of the distance sequence provides the information relating to the frame timing, and a pattern of the distances defined by the second portion of the distance sequence provides the information relating to the scrambling code.

17. The format of claim 15 wherein the pattern of distances defined by the distance sequence provides the information useful in identifying frame timing, and wherein the information relating to the scrambling code is conveyed by modulation values, selected in accordance with a predetermined modulation sequence, for the plural combined codes $\bar{c}_{s/lci}$ within the frame.

18. The format of claim 15 wherein the pattern of distances defined by the distance sequence provides the information useful in identifying scrambling code, and wherein the information relating to the frame timing is conveyed by modulation values, selected in accordance with a predetermined modulation sequence, for the plural combined codes $\bar{c}_{s/lci}$ within the frame.

19. The format of claim 1 wherein the primary code $\bar{c}_p$ comprises a pilot code.

20. The format of claim 1 wherein the scrambling code comprises a long code.

21. A code division multiple access communications system, comprising:
 a base station transmitter for generating a downlink synchronization code transmission, comprising:
  a repeating frame comprising a plurality of slots;
  a primary synchronization code $\bar{c}_p$ repeated in each slot of the repeating frame; and
  a secondary synchronization combined code $\bar{c}_{s/lci}$ providing information useful in a process for identifying both a frame timing and a scrambling code for the downlink transmission; and
 a mobile station for receiving the downlink synchronization code transmission and recovering the information useful for identifying both a frame timing and a scrambling code.

22. The system of claim 21 wherein the information relating to the scrambling code is conveyed by the combined code $\bar{c}_{s/lci}$ itself.

23. The system of claim 21 wherein the information relating to the frame timing is conveyed by modulation values, selected in accordance with a predetermined modulation sequence, for the plural combined codes $\bar{c}_{s/lci}$ within the frame.

24. The system of claim 23 wherein modulation implemented by the modulation sequence on the plural combined codes $\bar{c}_{s/lci}$ within the frame comprises binary phase shift keyed (BPSK) modulation.

25. The system of claim 23 wherein modulation implemented by the modulation sequence on the plural combined codes $\bar{c}_{s/lci}$ within the frame comprises quadrature phase shift keyed (QPSK) modulation.

26. The system of claim 21 wherein the information relating to the frame timing and scrambling code is conveyed by modulation values, selected in accordance with a predetermined modulation sequence, for the plural combined codes $\bar{c}_{s/lci}$ within the frame.

27. The system of claim 26 wherein the modulation sequence comprises a first portion and a second portion, and wherein a pattern of the modulation defined by the first portion of the modulation sequence provides the information relating to the frame timing, and a pattern of the modulation defined by the second portion of the modulation sequence provides the information relating to the scrambling code.

28. The system of claim 26 wherein a pattern of the modulation defined by the modulation sequence explicitly provides the information relating to the scrambling code and implicitly provides the information relating to the frame timing.

29. The system of claim 21 wherein a part of the information relating to the scrambling code is conveyed by the combined code $\bar{c}_{s/lci}$ itself.

30. The system of claim 29 wherein the information relating to the frame timing and scrambling code is conveyed by modulation values, selected in accordance with a predetermined modulation sequence, for the plural combined codes $\bar{c}_{s/lci}$ within the frame.

31. The system of claim 30 wherein a pattern of the modulation defined by the modulation sequence explicitly provides another part of the information relating to the scrambling code and implicitly provides the information relating to the frame timing.

32. The system of claim 21 wherein at least part of the information relating to the scrambling code is conveyed by a sequence of the combined codes $\bar{c}_{s/lci}$ included within the frame, the sequence further implicitly providing the information relating to the frame timing.

33. The system of claim 32 wherein further information relating to the scrambling code is conveyed by modulation values, selected in accordance with a predetermined modulation sequence, for the plural combined codes $\bar{c}_{s/lci}$ within the frame.

34. The system of claim 33 wherein a pattern of the modulation defined by the modulation sequence explicitly provides another part of the information relating to the scrambling code.

35. The system of claim 21 wherein each combined code $\bar{c}_{s/lci}$ is offset from its associated primary code $\bar{c}_p$ in a slot by a distance specified by a pattern of distances in a distance sequence, and wherein the pattern of distances defined by the distance sequence provides the information useful in identifying frame timing and/or scrambling code.

36. The system of claim 35 wherein the distance sequence comprises a first portion and a second portion, and wherein a pattern of the distances defined by the first portion of the distance sequence provides the information relating to the frame timing, and a pattern of the distances defined by the second portion of the distance sequence provides the information relating to the scrambling code.

37. The system of claim 35 wherein the pattern of distances defined by the distance sequence provides the information useful in identifying frame timing, and wherein the information relating to the scrambling code is conveyed by modulation values, selected in accordance with a predetermined modulation sequence, for the plural combined codes $\bar{c}_{s/Ici}$ within the frame.

38. The system of claim 35 wherein the pattern of distances defined by the distance sequence provides the information useful in identifying scrambling code, and wherein the information relating to the frame timing is conveyed by modulation values, selected in accordance with a predetermined modulation sequence, for the plural combined codes $\bar{c}_{s/Ici}$ within the frame.

39. The system of claim 21 wherein the primary code $\bar{c}_p$ comprises a pilot code.

40. The system of claim 21 wherein the scrambling code comprises a long code.

* * * * *

UNITED STATES PATENT AND TRADEMARK OFFICE
CERTIFICATE OF CORRECTION

PATENT NO.   : 5,930,366
DATED        : July 27, 1999
INVENTOR(S)  : Jamal et al.

It is certified that error appears in the above-identified patent and that said Letters Patent is hereby corrected as shown below:

Column 6,
Line 19, replace "t," with -- $t_1$, --

Column 10,
Line 9, replace "$N_{s/1ci}*M$" with -- $N_{s/1ci\text{-}seq}*M$ --

Signed and Sealed this

Second Day of October, 2001

Attest:

NICHOLAS P. GODICI
Attesting Officer    Acting Director of the United States Patent and Trademark Office